S. W. SPARKS.
METAL WORKING MACHINE.
APPLICATION FILED MAR. 27, 1916.
1,199,312.
Patented Sept. 26, 1916.
4 SHEETS—SHEET 3.
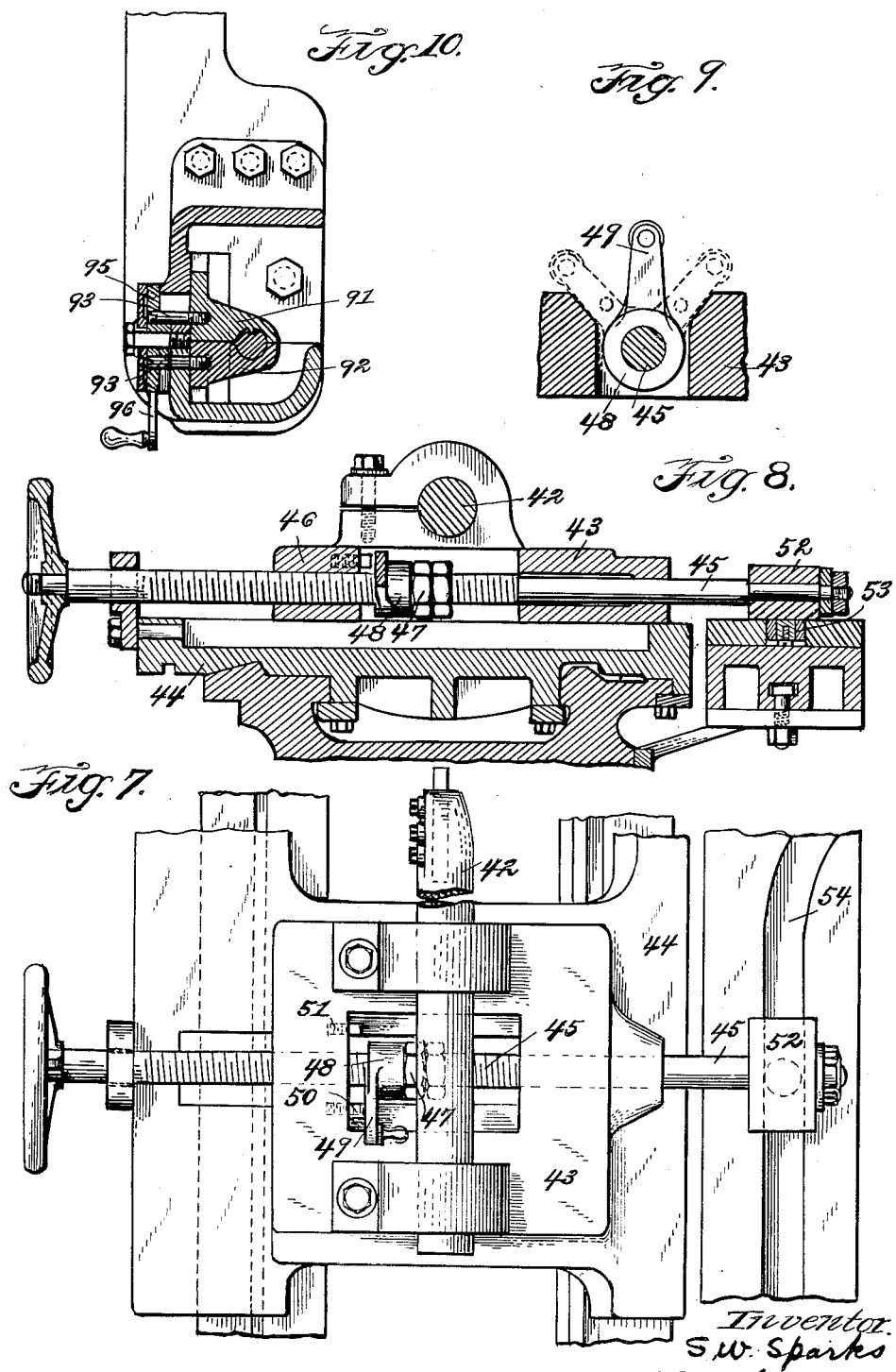

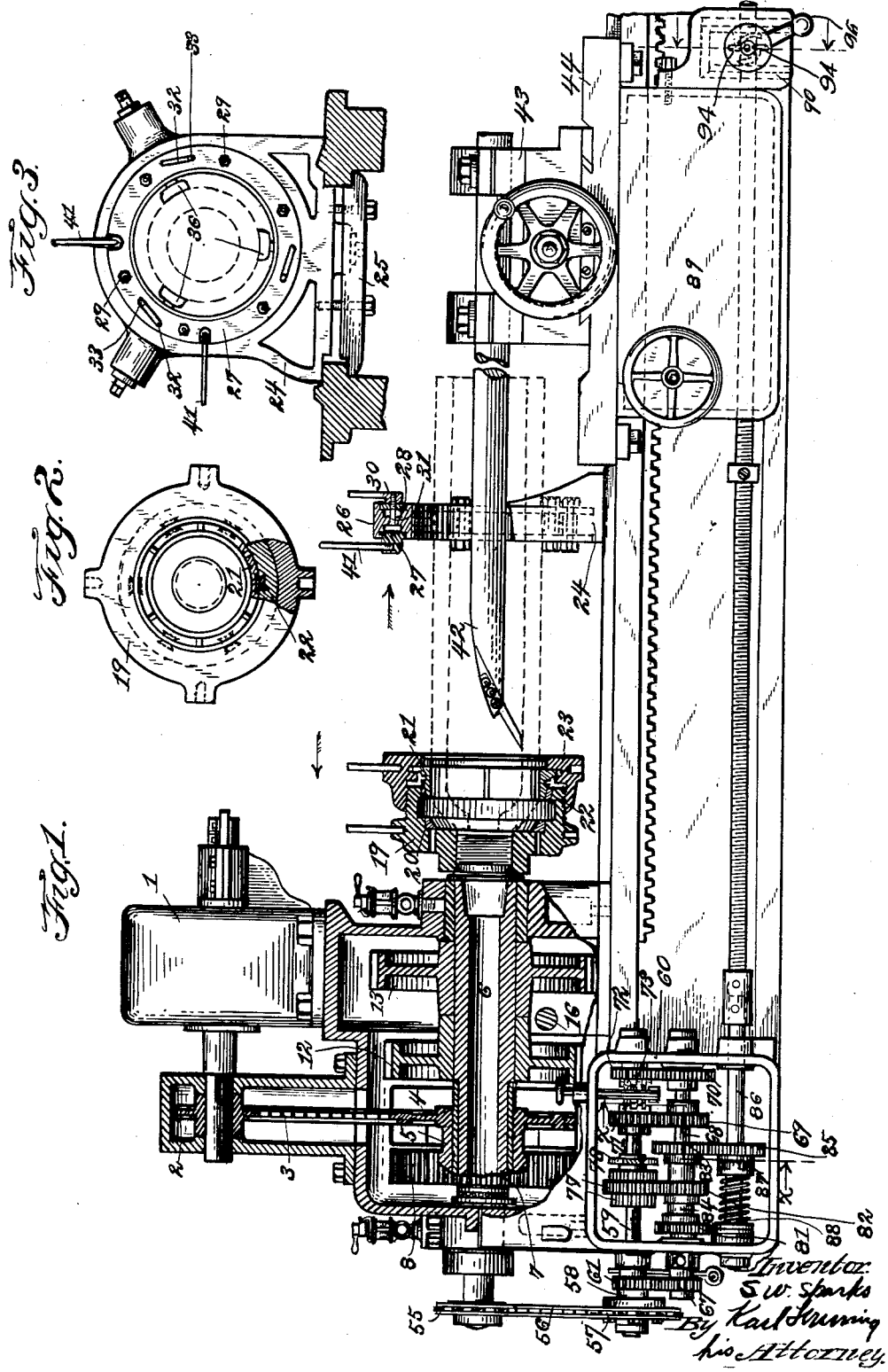

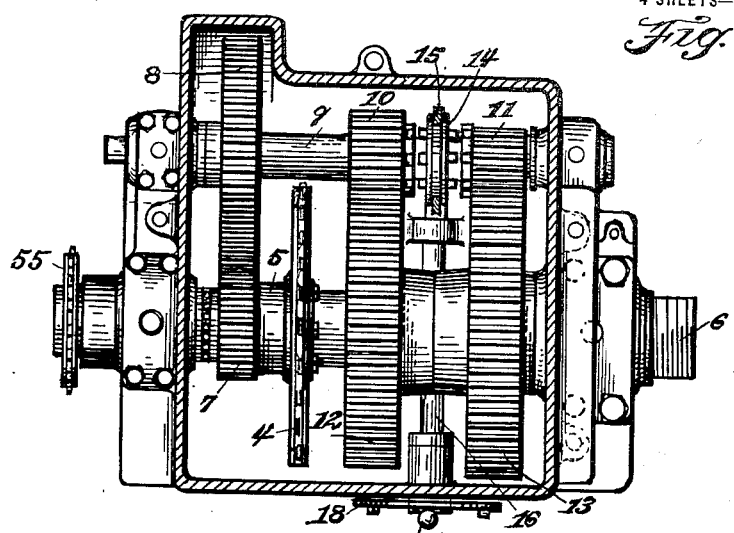
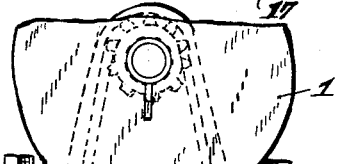
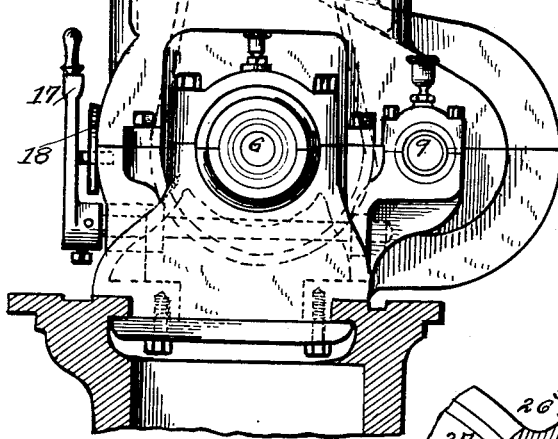
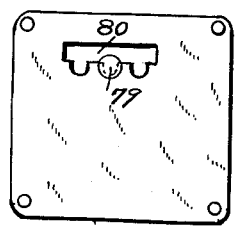
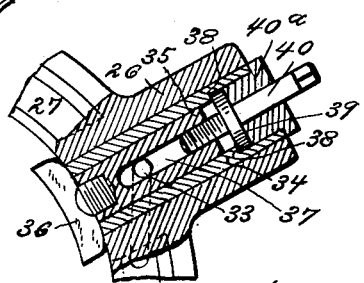

S. W. SPARKS.
METAL WORKING MACHINE.
APPLICATION FILED MAR. 27, 1916.
1,199,312.
Patented Sept. 26, 1916.
4 SHEETS—SHEET 4.
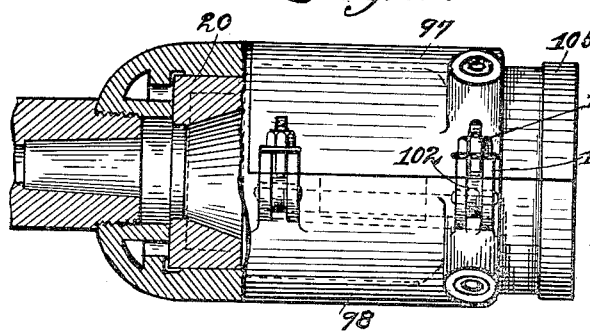
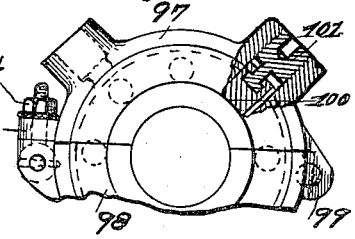
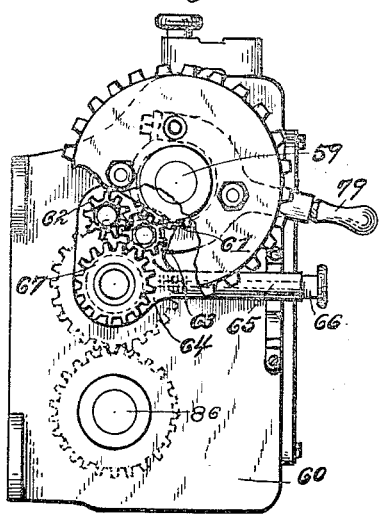
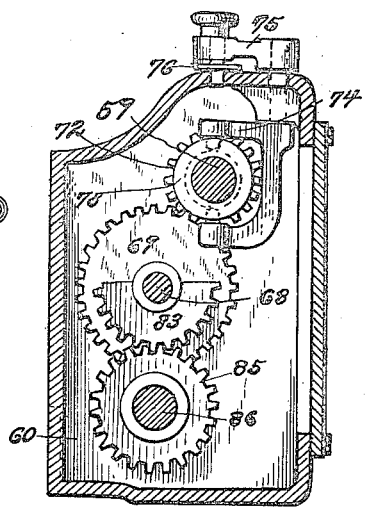
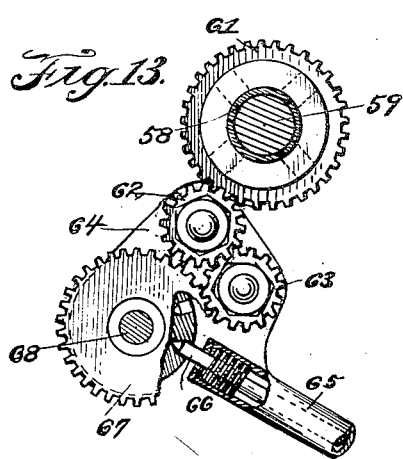
Inventor.
S. W. Sparks
By Karl Finning
his Attorney

UNITED STATES PATENT OFFICE.

STANLEY W. SPARKS, OF CLEVELAND, OHIO, ASSIGNOR TO THE CLEVELAND MACHINERY & SUPPLY COMPANY, A CORPORATION OF OHIO.

METAL-WORKING MACHINE.

1,199,312.      Specification of Letters Patent.      Patented Sept. 26, 1916.

Application filed March 27, 1916. Serial No. 86,838.

*To all whom it may concern:*

Be it known that I, STANLEY W. SPARKS, a citizen of the United States, residing at Cleveland, Ohio, have invented certain new and useful Improvements in Metal-Working Machines, of which the following is a specification.

My invention relates particularly to that class of machines which are generally known as lathes and are used for cutting and forming a piece of metal.

My improvement includes a head stock for the lathe with the necessary operating gears therein and a spindle to which is attached a chuck for holding the material to be worked upon, and with which is associated a steadying rest mounted upon the bed of the lathe. I also include a gear box on the lathe support which is driven from the spindle and which in turn drives the lead shaft which operates the tool carriage. In the specific instance shown, the tool carriage is a support for a boring bar and in addition to the usual apparatus for driving it, I provide an attachment thereon which will drive the apron directly from the lead shaft without the intermediate gearing usually found in the apron.

In the accompanying drawings, which show one form of my invention Figure 1 is a side elevation of a lathe provided with my invention, parts being broken away and parts being in section to indicate the construction. Fig. 2 is a side elevation of the chuck, being broken away in part to show the interior construction. Fig. 3 is a side elevation of the steadying support for the material to be operated upon. Fig. 4 is a sectional detail of the head stock. Fig. 5 is a plan view of the gearing in the head stock, the casing being shown in section. Fig. 6 is an end view of the head stock. Fig. 7 is a plan view of the tool carriage. Fig. 8 is a transverse sectional view of the tool carriage. Fig. 9 is a sectional detail thereof. Fig. 10 is a transverse sectional view of the driving attachment on the apron. Fig. 11 is an end view of the gear box for driving the lead shaft, part being broken away so as to more clearly show the construction. Fig. 12 is a section in the gear box on the line X of Fig. 1. Fig. 13 is a detail somewhat enlarged of part of the mechanism associated with the gear box, part being broken away so as to show the construction. Fig. 14 is a front elevation of the face plate of the gear box. Fig. 15 is a front elevation of an optional form of chuck; and Fig. 16 an end view of the chuck shown in Fig. 15, parts of both Figs. 15 and 16 being broken away to show the details of construction.

The lathe is driven by a motor 1 on the shaft of which is a sprocket 2 from which runs a driving chain 3 to a sprocket 4 on a sleeve 5 revolving on the spindle 6. The sleeve 5 also carries a gear 7, which engages a gear 8 on the back shaft 9. Also on the back shaft 9 are two loose gears 10 and 11, differing in size, and engaging two gears 12 and 13 on the spindle which differs from each other in size. A clutch 14 on the back shaft may engage either gear 10 or gear 11 and so cause the spindle to be driven at one speed or another. The clutch 14 is moved by a yoke 15 rising from a shaft 16 which crosses the head stock and which has at its front end an operating handle 17 which may be held by an arc 18 in such a position that clutch 14 engages the gear 10, or engages the gear 11, or is in the intermediate position and engages neither gear. The spindle carries a chuck 19 having a gasket 20 preferably conforming to the external shape of the material to be worked upon and against which the material rests. A split collet 21 is at the forward end of the chuck. The collet is made up of a plurality of separate portions held into the chuck by double dove-tailed keys 22 and forced inward by turning the usual annular cap 23 which screws onto the base of the chuck.

Toward the other end of the material to be operated upon is a steadying rest 24 which is attached, by the clamp 25, to the bed of the lathe. The steadying rest consists of a central annular casting 26 and two annular plates 27 and 28, one on each side of the casting 26 and rigidly connected together by bolts 29. A hand nut 30 screws onto a tap screw 31 in the annular casting 26 and clamps the plate 28 (and consequently plate 27 which is connected to it by bolts 29) against movement. The plates 27 and 28 are provided with cam slots 32 in which rest pins 33 which pass through and project from cylinders 34 placed at suitable points around the annular casting 26. In each cylinder 34 is a plug 35 into the inner end of which is screwed a roller or shoe 36, which may be of any suitable form. There is a slot 37 in each plug 35 through which passes the pin 33. Toward the outer end of the cylinder is a shoulder 38 against which rests a collar 39 on a bolt 40 which screws into the end of the plug 35. Surrounding the bolt 40 and resting on the collar 39 is a hollow plug 40ª screwed into the cylinder 34. By turning the bolt 40, the plug 35 and consequently the shoe 36 carried by it may be moved toward or away from the center of the annular casting 26. It is thus possible to provide an individual adjustment for each shoe to accommodate and support material of various sizes and shapes while at the same time all of the shoes may be advanced toward or retracted from the work within the steadying support by loosening the clamping nut 30 and turning the plates 27 and 28 by means of radial handles 41.

The tool carriage 44 supports the boring bar 42 in a bar holder 43 which has a transverse movement on the carriage 44. Passing through the carriage is a screw shaft 45 which engages a threaded portion 46 of the bar holder so that when the screw shaft 45 is rotated, the bar holder is moved toward or away from the front of the lathe. On the screw shaft are a pair of nuts 47 against which rests a loose collar 48 provided with a handle 49 which when in the right hand position, shown in dotted lines in Fig. 9, engages a stop 50 and so limits the movement of the bar holder across the bed of the lathe. The stop 50 may be so adjusted as to make the boring bar give the proper cut for roughing the material to be worked upon. A stop 51 is provided against which the handle 49 may be brought when in the left hand position, shown in dotted lines in Fig. 9, to cause the proper finishing cut. When the handle 49 is in the position showing the full lines in Fig. 9, it will pass between the stops 50 and 51 and so the boring bar may be withdrawn from the work without dragging the cutting tool across the finished surface. At the end of the screw shaft 45 is a block 52 from which depends a roller 53 traveling in the cam slot 54 so as to move the bar holder 43 to properly shape the material to be operated upon.

On the outer end of the spindle there is a sprocket 55 over which travels a chain 56 engaging a sprocket 57 carried by a sleeve 58 on a shaft 59 projecting from the gear box 60. The sleeve 58 also carries a gear 61 which engages either a gear 62 or a gear 63 both of which are carried in a bracket 64, having a handle 65 in which is a spring controlled locking bar 66. The gear 63 is always in engagement with a gear 67 on a shaft 68 also passing through the gear box 60. The bracket 64 is pivoted to swing about the shaft 68 and the hub of the shaft 68 is provided with sockets into which the locking bar 66 enters so as to hold the bracket in either of its adjusted positions. When the bracket is in the position shown in Fig. 11, the gear 63 engages the gear 61 as well as the gear 67. When the bracket is in the position shown in Fig. 13 the gear 63 is out of engagement with gear 61 but the gear 62 is in engagement with the gear 61. The gears 62 and 63 are permanently in engagement with each other. In the position shown in Fig. 11 motion is transmitted from the sprocket 57 through the sleeve 58 to the gear 61, gear 63 to gear 67 and so to the shaft 68.

With the device in the position shown in Fig. 13 the shaft 68 will be driven in the opposite direction taking its motion from the sprocket 57 through sleeve 58 and the gear 61 to 62 which is in engagement with the gear and which will in turn drive the gear 67 on the shaft 68. On the shaft 68 are two gears 69 and 70 which engage respectively gears 71 and 72 loosely mounted on the shaft 59. A clutch 73 on the shaft 59 is operated by a yoke 74. The yoke 74 has a lever arm 75 which engages an arc 76 and by it is held in one of three positions so that the clutch 73 may engage either the gear 71, or the gear 72, or may be in neutral and engage neither of these gears. The shaft 59 may be driven at a speed depending upon whether the clutch 73 engages the gear 71 or the gear 72. Keyed on the shaft 59 but having lateral movement thereon, is a block 77 which is operated by a yoke 78 having a handle 79 which is provided with a three-stop guide 80 in the face plate on the gear box. In Fig. 14 the handle 79 is shown in the middle stop of the guide 80. It may be lifted and shifted with the block 77 either to the right or to the left. By this arrangement one of the gears in the block 77 may engage one of the gears 81, 82 or 83 all of which are on the sleeve 84 around the shaft 68. The gear 83 is permanently in engagement with a gear 85 loose on the lead shaft 86 and normally held in engagement with a clutch 87 on the lead shaft through a spring 88. The lead shaft drives the tool carriage through the apron mechanism 89. It may, however, be desirable to eliminate the use of the usual gears and clutch in the apron and provide a more direct and uniform drive for the tool carriage. This will be especially desirable when the machine is being used to cut a thread in which instance a lead shaft, cut with the proper pitch of thread, may be inserted and the auxiliary driving device 90 brought into use. This device consists of two parts of a split nut 91 and 92 each provided with a pin 93 each of which rides in a cam slot 94 in a disk 95. The split nut may be operated by a handle 96. Obviously, when the split nut is separated the driving device is free from the lead shaft and the mechanism in the apron 89 may be relied upon to drive the tool carriage.

In Figs. 15 and 16 I have shown an optional form of chuck which may be screwed on to the spindle in place of that shown in Fig. 1. This device is made in two castings 97 and 98 hinged together at 99 so that the top portion 97 may be thrown upward for the insertion of the material to be worked upon, which may be brought into engagement with the gasket 20 at the inner end of the chuck and will be suitably supported and positioned by a plurality of plugs 100 circumferentially arranged toward the outer end of the chuck castings. Each plug 100 is feathered into a socket in one of the castings and engaged by a headed screw plug 101 into which may be inserted a wrench or turning bar for adjusting the plug toward or from the work to be supported. The two parts of the casing 97 and 98 are locked closed by means of eye bolts 102 swiveled in the casting 98 and arranged when thrown upward to extend through slotted lugs 103 in the casting 97 against which the nut 104 on the eye bolt may be screwed to lock the two together. In connection with this form of chuck, I prefer to use the steadying support 24 shown in Figs. 1 and 3, and for reception of the shoes 36 thereon, I provide a machined surface 105 at the outer end of the chuck as indicated in Fig. 15.

I claim as my invention: -

1. In a lathe, a spindle, a sleeve on the spindle, means for rotating the sleeve, a gear on the sleeve, a back shaft, a gear on the back shaft engaging the gear on the sleeve, two loose gears on the back shaft, two gears on the spindle respectively engaging the loose gears on the back shaft, a clutch on the back shaft, means for causing the clutch to engage one or the other of the gears loose on the back shaft, a sprocket on the spindle, a chain on the sprocket, a second sprocket over which the chain runs, a lead shaft driven by the second sprocket, and a tool carriage driven by the lead shaft.

2. In a lathe, a spindle, means for rotating the spindle, a sprocket on the spindle, a chain on the sprocket, a second sprocket over which the chain runs, a hollow shaft carrying the second sprocket, a gear on the hollow shaft, a second shaft, a gear thereon, a pivoted bracket, two gears in the bracket which engage each other and either of which may engage the gear on the hollow shaft and one of which engages the gear on the second shaft, two other gears on said shaft, a shaft within the hollow shaft, two gears in engagement with said last mentioned two gears and loose on the shaft within the hollow shaft, a clutch to cause either of the loose gears to rotate with the shaft, a laterally movable block of three gears on the said shaft, a tool carriage, a lead shaft for driving the tool carriage, a releasable gear on the lead shaft, three gears on a sleeve on the second shaft one of which engages the gear on the lead shaft, and means for causing the block of three gears to engage either of the three gears on the sleeve.

3. In a lathe, a spindle, a sleeve on the spindle, means for rotating the spindle, a sprocket on the spindle, a chain on the sprocket, a second sprocket over which the chain runs, a lead shaft driven by the second sprocket, a tool carriage driven by the lead shaft, means for releasing the carriage from the lead shaft, a worm shaft in the carriage, a tool support engaged by the worm shaft, stop nuts on the worm shaft, a sleeve on the worm shaft, a handle for the sleeve, and stops on the tool support to engage the handle and having a recess between them to receive the handle.

4. In a lathe, a spindle, a sleeve on the spindle, means for rotating the sleeve, a gear on the sleeve, a back shaft, a gear on the back shaft engaging the gear on the sleeve, two loose gears on the back shaft, two gears on the spindle respectively engaging the loose gears on the back shaft, a clutch on the back shaft, means for causing the clutch to engage one or the other of the gears loose on the back shaft, a sprocket on the spindle, a chain on the sprocket, a second sprocket over which the chain runs, a lead shaft driven by the second sprocket, a tool carriage driven by the lead shaft, means for releasing the carriage from the lead shaft, a tool support on the tool carriage, and means for moving the tool support.

5. In a lathe, a spindle, means for rotating the spindle, a sprocket on the spindle, a chain on the sprocket, a second sprocket over which the chain runs, a hollow shaft carrying the second sprocket, a gear on the hollow shaft, a second shaft, a gear thereon, a pivoted bracket, two gears in the bracket which engage each other and either of which may engage the gear on the hollow shaft and one of which engages the gear on the second shaft, two other gears on said shaft, a shaft within the hollow shaft, two gears in engagement with said last mentioned two gears and loose on the shaft within the hollow shaft, a clutch to cause either of the loose gears to rotate with the shaft, a laterally movable block of three gears on the said shaft, a tool carriage, a lead shaft for driving the tool carriage, a releasable gear on the lead shaft, three gears on a sleeve on the second shaft one of which engages the gear on the lead shaft, means for causing the block of three gears to engage either of the three gears on the sleeve, a tool support on the carriage, and means for moving the tool support.

6. In a lathe, a spindle, means for rotating the spindle, a tool carriage, a lead shaft for driving the tool carriage, means for driving the lead shaft, a worm shaft in the carriage, a tool support engaged by the worm shaft, stop nuts on the worm shaft, a sleeve on the worm shaft, a handle for the sleeve, stops on the tool support to engage the handle and having a recess between them to receive the handle, and a work support on the lathe bed.

7. In a lathe, a spindle, a sleeve on the spindle, means for rotating the sleeve, a gear on the sleeve, a back shaft, a gear on the back shaft engaging the gear on the sleeve, two loose gears on the back shaft, two gears on the spindle respectively engaging the loose gears on the back shaft, a clutch on the back shaft, means for causing the clutch to engage one or the other of the gears loose on the back shaft, a sprocket on the spindle, a chain on the sprocket, a second sprocket over which the chain runs, a lead shaft driven by the second sprocket, a tool carriage driven by the lead shaft, means for releasing the carriage from the lead shaft, a tool support on the carriage, means for moving the tool support, a work support on the lathe bed, and a chuck on the spindle.

8. In a lathe, a spindle, means for rotating the spindle, a sprocket on the spindle, a chain on the sprocket, a second sprocket over which the chain runs, a hollow shaft carrying the second sprocket, a gear on the hollow shaft, a second shaft, a gear thereon, a pivoted bracket, two gears in the bracket which engage each other and either of which may engage the gears on the hollow shaft and one of which engages the gear on the second shaft, two other gears on said shaft, a shaft within the hollow shaft, two gears in engagement with said last mentioned two gears and loose on the shaft within the hollow shaft, a clutch to cause either of the loose gears to rotate with the shaft, a laterally movable block of three gears on the said shaft, a tool carriage, a lead shaft for driving the tool carriage, a releasable gear on the lead shaft, three gears on a sleeve on the second shaft one of which engages the gear on the lead shaft, means for causing the block of three gears to engage either of the three gears on the sleeve, means for releasing the carriage from the lead shaft, a tool support on the carriage, means for moving the tool support, a work support on the lathe bed, and a chuck on the spindle.

9. In a lathe, a spindle, means for rotating the spindle, a sprocket on the spindle, a chain on the sprocket, a second sprocket over which the chain runs, a lead shaft driven by the second sprocket, a tool carriage driven by the lead shaft, means for releasing the carriage from the lead shaft, a worm shaft in the carriage, a tool support engaged by the worm shaft, stop nuts on the worm shaft, a sleeve on the worm shaft, a handle for the sleeve, stops on the tool support to engage the handle and having a recess between them to receive the handle, a work support on the lathe bed, and a chuck on the spindle.

STANLEY W. SPARKS.